United States Patent
Koshi et al.

(10) Patent No.: US 11,566,114 B2
(45) Date of Patent: Jan. 31, 2023

(54) FIBER-REINFORCED THERMOPLASTIC RESIN FILAMENT AND SHAPED PRODUCT OF SAME

(71) Applicant: Toray Industries, Inc., Tokyo (JP)

(72) Inventors: Masayuki Koshi, Nagoya (JP); Yoshihiro Naruse, Nagoya (JP); Shoma Ishida, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 349 days.

(21) Appl. No.: 16/759,252

(22) PCT Filed: Nov. 5, 2018

(86) PCT No.: PCT/JP2018/041029
§ 371 (c)(1),
(2) Date: Apr. 24, 2020

(87) PCT Pub. No.: WO2019/093277
PCT Pub. Date: May 16, 2019

(65) Prior Publication Data
US 2020/0369838 A1    Nov. 26, 2020

(30) Foreign Application Priority Data

Nov. 7, 2017 (JP) .............................. JP2017-214604

(51) Int. Cl.
| | | |
|---|---|---|
| *C08J 5/04* | (2006.01) | |
| *D06M 15/63* | (2006.01) | |
| *D06M 15/647* | (2006.01) | |
| *D06M 101/30* | (2006.01) | |

(52) U.S. Cl.
CPC .............. *C08J 5/042* (2013.01); *D06M 15/63* (2013.01); *D06M 15/647* (2013.01); *C08J 2371/00* (2013.01); *C08J 2381/04* (2013.01); *D06M 2101/30* (2013.01)

(58) Field of Classification Search
CPC ....... B29C 70/16; B29C 70/205; B29C 64/40; G06F 2113/10; B29B 15/12; B29K 2307/04; B29K 2105/08; B29K 2101/12

USPC ............ 428/378, 297.4, 299.1, 299.4, 299.7, 428/308.4, 359, 361, 375, 374, 368, 364, 428/397, 396, 401, 395; 524/494, 495

See application file for complete search history.

(56) References Cited

U.S. PATENT DOCUMENTS

| 9,126,365 B1 | 9/2015 | Mark et al. |
| 2007/0003656 A1 | 1/2007 | LaBossiere et al. |

FOREIGN PATENT DOCUMENTS

| CN | 103770241 A | 5/2014 | |
| CN | 106903906 A | 6/2017 | |
| JP | 2001-200068 A | 7/2001 | |
| JP | 2009-500194 A | 1/2009 | |
| JP | 2016-518267 A | 6/2016 | |
| JP | 2017-105153 A | 6/2017 | |
| JP | 2017-128072 A | 7/2017 | |
| WO | 2015/046290 A1 | 4/2015 | |
| WO | WO-2015046290 A1 * | 4/2015 | ........... B29B 15/125 |

OTHER PUBLICATIONS

Second Office Action dated Sep. 2, 2022, of counterpart Chinese Patent Application No. 201880056680.5., along with a machine translation in English.

* cited by examiner

*Primary Examiner* — Camie S Thompson
(74) *Attorney, Agent, or Firm* — DLA Piper LLP (US)

(57) ABSTRACT

A fiber-reinforced thermoplastic resin filament is obtained by impregnating a continuous reinforcing fiber with a thermoplastic resin, and satisfies all of conditions (a) to (c).
(a) The volume ratio of a reinforcing fiber in a fiber-reinforced thermoplastic resin filament is 30 to 80%; and the volume ratio of a thermoplastic resin in a fiber-reinforced thermoplastic resin filament is 70 to 20%.
(b) The thickness of a fiber-reinforced thermoplastic resin filament is 0.01 to 3 mm.
(c) The length of a filament contained in a fiber-reinforced thermoplastic resin filament is 1 m or more.

9 Claims, No Drawings

FIBER-REINFORCED THERMOPLASTIC RESIN FILAMENT AND SHAPED PRODUCT OF SAME

TECHNICAL FIELD

This disclosure relates to a fiber-reinforced thermoplastic resin filament and a shaped product thereof.

BACKGROUND

Fiber-reinforced thermoplastic resin base materials made of continuous reinforcing fiber impregnated with thermoplastic resin are excellent in specific strength, specific rigidity, lightweight effect, heat resistance and chemical resistance so that they are suitably used for transportation equipment such as airplanes and automobiles or various products such as sports gear and electric/electronic components. Because of recent increasing in demand of lightweight for airplanes and automobiles, metal parts have been replaced by resin parts while components have been downsized and modularized so that developments of material excellent in formability and mechanical property have been expected.

Recently, fiber-reinforced thermoplastic resin base materials have focused on laminating molten thermoplastic resin such as fused deposition modeling used for 3D printing method. JP 2009-500194 A discloses a deposition modeling of molten thermoplastic resin being developed in each field because of advantageous cost. The fiber-reinforced thermoplastic resin base material applied to such a forming method has typically been produced by extruding reinforcing fibers cut into short fibers together with thermoplastic resin to make a strand of fiber-reinforced thermoplastic resin. However, the short fiber-reinforced thermoplastic resin base material can hardly be improved in fiber content while such a short fiber length has only a limited reinforcing ability.

JP 2017-128072 A discloses a continuous fiber-reinforcing thermoplastic resin base material employed to exhibit a high reinforcing ability.

The base material before the forming process disclosed in JP 2017-128072 A having many voids inside which should be removed at the time of forming has to be improved in quality and productivity of the shaped product.

In view of the above-described background technologies, it could be helpful to provide a fiber-reinforced thermoplastic resin filament excellent in quality such as void and reinforcing fiber dispersion and handling ability during the forming process.

SUMMARY

We thus provide:

[1] A fiber-reinforced thermoplastic resin filament of continuous reinforcing fiber impregnated with a thermoplastic resin, having
(a) a volume content of the reinforcing fiber of 30 to 80 vol % and a volume content of the thermoplastic resin filament of 70 to 20 vol %,
(b) a thickness of 0.01 to 3 mm, and
(c) a filament length of 1 m or more.
[2] The fiber-reinforced thermoplastic resin filament according to [1], further having a void rate of 5% or less.
[3] The fiber-reinforced thermoplastic resin filament according to [1] or [2], further having a flexural rigidity of 1 N·m$^2$ or less.
[4] The fiber-reinforced thermoplastic resin filament according to any one of [1] to [3], wherein the reinforcing fiber is made of at least one selected from a group consisting of a carbon fiber, a glass fiber and an aramid fiber.
[5] The fiber-reinforced thermoplastic resin filament according to any one of [1] to [4], wherein the thermoplastic resin is made of at least one selected from a group consisting of polyphenylene sulfide resin (PPS), polyarylene ether ketone resin (PAEK), polyetherimide resin (PEI), polyether sulfone resin (PES) and a liquid crystalline polymer resin (LCP).
[6] The fiber-reinforced thermoplastic resin filament according to any one of [1] to [5], wherein the reinforcing fiber has 90% or more of an average value D of a dispersion parameter d calculated by a series of steps (i) to (iv):
(i) taking an image of a cross section of the fiber-reinforced thermoplastic resin filament perpendicular to an orientation direction;
(ii) dividing the image of the cross section into square units having a side length t within a range of Formula (1);
(iii) calculating the dispersion parameter d by Formula (2); and
(iv) calculating the average value D of the dispersion parameter d by repeating a plurality of sets of steps (i) to (iii), $$1.5a \leq t \leq 2.5a \quad (1),$$

where:
a: fiber diameter; and
t: side length of unit, $$\text{Dispersion parameter } d = 100 \times (\text{the number of units including reinforcing fibers within range})/(\text{the number of all units}) \quad (2).$$

[7] The fiber-reinforced thermoplastic resin filament according to any one of [1] to [6], wherein the average value D of the dispersion parameter d has 4% or more of a coefficient of variance.
[8] The fiber-reinforced thermoplastic resin filament according to any one of [1] to [7], further having a cross-section shape of circle, quadrangle, ellipse, oval or star.
[9] The fiber-reinforced thermoplastic resin filament according to any one of [1] to [8], further having an outer most layer coated with the thermoplastic resin.
[10] A shaped product, comprising the fiber-reinforced thermoplastic resin filament according to any one of [1] to [9].

We can achieve good handling ability at the time of forming since our fiber-reinforced thermoplastic resin filament made by impregnating continuous reinforcing fibers with thermoplastic resin has a thin thickness and a filament length longer than a predetermined length. We can also achieve a good reinforcing effect since our fiber-reinforced thermoplastic resin filament has a high fiber content and an excellent quality such as uniformity of reinforcing fibers.

DETAILED DESCRIPTION

Hereinafter, our filaments and shaped products will be explained in detail. An example of our fiber-reinforced thermoplastic resin filament is made by impregnating continuous reinforcing fibers with thermoplastic resin.

The continuous reinforcing fiber means a reinforcing fiber having no substantial break in the fiber-reinforced thermoplastic resin. The "no substantial break" includes a filament consisting of 80% or more of single yarns without break although it is ideal that all single fibers have no break in a filament. The reinforcing fibers may have a unidirectionally-oriented formation such as braid and tow. To efficiently enhance mechanical properties along a specific direction, it is preferable that the reinforcing fibers are unidirectionally-arranged.

The reinforcing fiber may be carbon fiber, metal fiber, organic fiber, inorganic fiber or the like, although it is not limited in particular. Two or more kinds thereof can be used together.

The carbon fibers include a PAN-based carbon fiber made from polyacrylonitrile (PAN) fiber, a pitch-based carbon fiber made from petroleum tar or petroleum pitch, cellulose-based carbon fiber made from viscose rayon or cellulose acetate, a vapor-grown carbon fiber made from hydrocarbons, and a graphitized fiber thereof. From a viewpoint of balance between strength and elastic modulus, it is preferable that the carbon fiber is a PAN-based carbon fiber.

The metal fiber is made from a metal such as iron, gold, silver, copper, aluminum, brass and stainless steel.

The organic fiber is made from an organic material such as aramid, polybenzoxazole (PBO), polyphenylene sulfide, polyester, polyamide and polyethylene. The aramid fiber may be a para-aramid fiber excellent in strength and elastic modulus or a meta-aramid fiber excellent in incombustibility and long-term heat resistance. The para-aramid fiber may be poly-p-phenylene terephthalamide fiber, copoly-p-phenylene 3,4'-oxydiphenylene-terephthalamide fiber or the like. The meta-aramid fiber may be poly-m-phenylene isophthalamide fiber. It is preferable that the aramid fiber is a para-aramid fiber, of which elastic modulus is higher than that of meta-aramid fiber.

The inorganic fiber may be made from an inorganic material such as glass, basalt, silicon carbide and silicon nitride. The glass fiber may be E glass fiber (used for electric use), C glass fiber (used for corrosion resistance), S glass fiber, T glass fiber (high strength, high elastic modulus) or the like. The basalt fiber excellent in heat resistance is made from a mineral called basalt. Although basalt generally contains 9-25 wt % of iron component such as FeO and FeO2 as well as 1-6 wt % of titanium component such as TiO and $TiO_2$, the iron or titanium component can be added in a fusion state to make the basalt fiber.

From a viewpoint of high mechanical properties suitable for reinforcing materials, it is preferable that the fiber-reinforced thermoplastic resin filament comprises carbon fibers as a reinforcing fiber.

The fiber-reinforced thermoplastic resin filament typically comprises one or more pieces of reinforcing fiber bundles made by bundling many single yarns. It is preferable that the number of single yarns is 500 to 50,000 in the reinforcing fiber bundles in the one or more pieces. From a viewpoint of handling ability, it is preferable that the reinforcing fiber bundles have single yarns of 1,000 to 50,000. It is preferably 1,000 to 40,000 and is more preferably 1,000 to 30,000. The upper limit of the number of single yarns in the reinforcing fiber bundles may be designed as considering the balance between handling ability and quality of void or dispersion to keep good handling ability and good dispersion.

The fiber-reinforced thermoplastic resin filament may have a modified cross-section shape such as circular shape, ellipse shape, oval shape, triangular shape, Y-shape, quadrangular shape, cross-shape, hollow shape, C-shape, checker board pattern and star shape, although it is not limited in particular. From a viewpoint of adhesion for the fused deposition modeling, it is preferable that the modified cross-section shape is circular shape, quadrangular shape, ellipse shape, oval shape or star shape.

It is possible that the fiber-reinforced thermoplastic resin filament has an outermost layer coated by thermoplastic resin. The outer periphery coated by thermoplastic resin can improve adhesion at the time of forming. The coating resin may be the same as, or different from, the one constituting the fiber-reinforced thermoplastic resin filament.

It is preferable that the reinforcing fiber bundle consists of 500 to 50,000 pieces of bundled single yarns of reinforcing fiber having an average diameter of 5 to 10 μm.

The thermoplastic resin may be a polyester such as polyethylene terephthalate (PET) resin, polybutylene terephthalate (PBT) resin, polytrimethylene terephthalate (PTT) resin, polyethylene naphthalate (PEN) resin and liquid crystalline polyester resin, a polyolefin such as polyethylene (PE) resin, polypropylene (PP) resin and polybutylene resin, styrene-based resin, polyoxymethylene (POM) resin, polyamide (PA) resin, polycarbonate (PC) resin, polymethylmethacrylate (PMMA) resin, polyvinyl chloride (PVC) resin, polyphenylene sulfide (PPS) resin, polyphenylene ether (PPE) resin, modified PPE resin, polyimide (PI) resin, polyamide-imide (PAI) resin, polyetherimide (PEI) resin, polysulfone (PSU) resin, modified PSU resin, polyether sulfone resin, polyketone (PK) resin, polyether ketone (PEK) resin, polyetheretherketone (PEEK) resin, polyether ketone ketone (PEKK) resin, polyarylate (PAR) resin, polyether nitrile (PEN) resin, phenolic resin, phenoxy resin, a fluorine-based resin such as polytetrafluoroethylene resin, a thermoplastic elastomer such as polystyrene-based resin, polyolefin-based resin, polyurethane-based resin, polyester-based resin, polyamide-based resin, polybutadiene-based resin, polyisoprene-based resin and fluorinated resin, or a copolymer or a modification thereof, or a blended resin of two or more kinds thereof. From viewpoints of heat resistance and long-term durability, it is preferable that the thermoplastic resin is polyphenylene sulfide resin, polyarylene ether ketone resin, polyetherimide resin, polyethersulfone resin or liquid crystalline polymer resin.

The polyarylene ether ketone (PAEK) resin may be polyether ketone (PEK), polyetheretherketone (PEEK), polyetheretherketone ketone (PEEKK), polyether ketone ketone (PEKK), polyether ketone ether ketone ketone (PEKEKK), polyetheretherketone ether ketone (PEEKEK), polyether ether ether ketone (PEEEK), polyether diphenyl ether ketone (PEDEK), or a copolymer or a modification thereof, or a blended resin of two or more kinds thereof.

The fiber-reinforced thermoplastic resin filament comprising continuous reinforcing fibers impregnated with the above-described thermoplastic resin may further contain a filler, another kind of polymer, an additive or the like as needed.

The fiber-reinforced thermoplastic resin filament can be obtained by impregnating continuous reinforcing fibers with thermoplastic resin.

The impregnation method may be a film method in which film-formed thermoplastic resin is fused and pressurized to impregnate reinforcing fiber bundles with thermoplastic resin, a commingling method in which, after spinning a mixture of fibrous thermoplastic resin and reinforcing fiber bundles, the fibrous thermoplastic resin is fused and pressurized to impregnate reinforcing fiber bundles with thermoplastic resin, a powder method in which, after dispersing powdery thermoplastic resin into gaps of fibers in the reinforcing fiber bundles, the powdery thermoplastic resin is fused and pressurized to impregnate reinforcing fiber bundles with thermoplastic resin, or a drawing method in which reinforcing fiber bundles are immersed in fused thermoplastic resin and pressurized to impregnate reinforcing fiber bundles with thermoplastic resin. It is preferable to employ the drawing method capable of preparing various kinds of fiber-reinforced thermoplastic resin filament different in thicknesses, fiber volume contents or the like.

The fiber-reinforced thermoplastic resin filament has a length of 1 m or more. The length of 1 m or more can continuously form a shape with thermoplastic resin.

The fiber-reinforced thermoplastic resin filament has a thickness of 0.01 to 3 mm. The thickness of 0.01 mm or more can improve the strength of shaped product made of the fiber-reinforced thermoplastic resin filament. It is preferably 0.1 mm or more. The thickness of 3 mm or less can secure flexibility of the fiber-reinforced thermoplastic resin filament to improve a handling ability at the time of forming shapes. It is preferably 1 mm or less and is more preferably 0.7 mm or less.

It is preferable that the fiber-reinforced thermoplastic resin filament has a flexural rigidity of 1 N·m$^2$ or less. The flexural rigidity of 1 N·m$^2$ or less can secure flexibility of the filament to improve a handling ability. It is preferably 0.1 N·m$^2$ or less, is more preferably 0.01 N·m$^2$ or less, and is specifically preferably 0.005 N·m$^2$ or less.

The fiber-reinforced thermoplastic resin filament has a reinforcing fiber volume content (Vf) of 30 vol % or more and 80 vol % or less in a whole fiber-reinforced thermoplastic resin filament of total 100 vol %. The reinforcing fiber volume content of 30 vol % or more can improve the strength of shaped product made of the fiber-reinforced thermoplastic resin filament. The Vf is preferably 40 vol % or more and is more preferably 50 vol % or more. The reinforcing fiber of 80 vol % or less can easily impregnate the reinforcing fibers with thermoplastic resin. It is preferable that the fiber-reinforced thermoplastic resin filament has a reinforcing fiber volume content of 75 vol % or less, preferably 70 vol % or less.

The volume content Vf of the fiber-reinforced thermoplastic resin filament is calculated by Formula (3) from mass W0 [g] of the fiber-reinforced thermoplastic resin filament and mass W1 [g] of residual reinforcing fiber left after heating the continuous fiber-reinforced thermoplastic resin filament to burn out the thermoplastic resin component at 500° C. in the air for 30 min.

$$Vf[\text{vol \%}]=100\times(W1/\rho f)/\{W1/\rho f+(W0-W1)/\rho 1\} \quad (3)$$

ρf: reinforcing fiber density [g/cm$^3$]
ρr: thermoplastic resin density [g/cm$^3$]

It is preferable that the fiber-reinforced thermoplastic resin filament has a void rate of 5% or less in the fiber-reinforced thermoplastic resin filament. The void rate of 5% or less can exhibit good mechanical properties of the fiber-reinforced thermoplastic resin filament without spoiling mechanical properties of the reinforcing fibers. The void rate is preferably 3% or less, and is more preferably 2% or less.

The void rate of the fiber-reinforced thermoplastic resin filament is determined by observing a cross section in the thickness direction of the fiber-reinforced thermoplastic resin filament as follows. Samples prepared by embedding fiber-reinforced thermoplastic resin filament with epoxy resin are polished to make a cross section in the thickness direction of the fiber-reinforced thermoplastic resin filament well observed. The polished samples are photographed at magnification of 400 times with an ultra deep color 3D shape measurement microscope VHX-950F (controller part)/VH-Z100R (measurer part) (made by Keyence Corporation). Images are taken within (500 μm width)×(thickness) of the fiber-reinforced thermoplastic resin filament. Areas of cross section and voids of the base material are measured with the taken images to calculate an impregnation rate by Formula (4).

$$\text{Void rate [\%]}=100\times(\text{Total area of voids})/(\text{Total area of fiber-reinforced thermoplastic resin filament}) \quad (4)$$

It is preferable that the fiber-reinforced thermoplastic resin filament has 90% or more of average dispersion parameter D defined as follows. The average value of dispersion parameter of 90% or more can reduce variation of mechanical properties of the fiber-reinforced thermoplastic resin filament.

Calculation of Average Dispersion Parameter D (i) A cross section image is taken in a direction approximately perpendicular to the orientation direction of the fiber-reinforced thermoplastic resin filament.

(ii) The cross section image is divided into square units each having a side length defined by Formula (1).

(iii) Dispersion parameter d is calculated by Formula (2) defining it.

(iv) Operations (i) to (iii) are repeated to calculate average D of dispersion parameter d.

$$1.5a \leq t \leq 2.5a \quad (1)$$

a: fiber diameter
t: side length of unit $$\text{Dispersion parameter } d=100\times(\text{the number of units including reinforcing fibers within range})/(\text{the number of all units}) \quad (2)$$

Evaluation Method

A sample of fiber-reinforced thermoplastic resin filament embedded with "EPOKWICK (registered trademark)" made by Buehler company is cured at room temperature for 24 hours and then the cross section approximately perpendicular to the orientation direction of reinforcing fibers of the fiber-reinforced thermoplastic resin filament is polished to take an image with an ultra deep color 3D shape measurement microscope VHX-950F (controller part)/VH-Z100R (measurer part) (made by Keyence Corporation) as changing a field of view.

The taken image of cross section of the fiber-reinforced thermoplastic resin filament is divided into approximately square units having a side length satisfying Formula (1) without overlapping mutually for an image analysis. The number of approximately square units including reinforcing fibers is counted by the image analysis in turn to calculate dispersion parameter d by Formula (2).

The above-described image analysis is performed to count the number of units including reinforcing fibers per the total number of sectioned approximately square units. The image is basically binarized by a discrimination analysis although the binarization can be performed by manually comparing the taken images.

Even a unit partially including a reinforcing fiber is counted as including reinforcing fibers while another unit including two or more reinforcing fibers is counted as the same.

Different fields of view of 20 or more in one polished surface are photographed to calculate average value D of dispersion parameter d measured from each image of cross section of fiber-reinforced thermoplastic resin filament so that reinforcing fiber distribution in the fiber-reinforced thermoplastic resin filament can be evaluated quantitatively. When the number of taken images is insufficient, a sufficient number of fields of view in a plurality of polished surfaces may be photographed to calculate average value D of dispersion parameter d.

According to Formula (1), the unit size is limited within a range defined by reinforcing fiber diameter observed. When the unit size is below the range, the dispersion parameter might be converged with volume content and fail to express the dispersibility exactly. When the unit size is above the range, the dispersion parameter might be constant and fail to express the dispersibility correctly. Therefore, it is preferable that the unit size satisfies Formula (1).

The coefficient of variance of dispersion parameter d can be calculated by Formula (5). When the coefficient of variance is more than 4%, the reinforcing fiber density might greatly change among fields in a fiber-reinforced thermoplastic resin filament. Therefore, it is preferable that the coefficient of variance is 4% or more, preferably 3% or more.

$$\text{Coefficient of variance} = 100 \times (\text{average of dispersion parameter } d)/(\text{standard deviation of dispersion parameter } d) \qquad (5)$$

A shaped product can be made by forming a laminate of any configuration of one or more of the fiber-reinforced thermoplastic resin filaments as heating and/or pressurizing as needed.

The heating and/or pressurizing process may be performed by: a press molding method in which any configuration of forming material laminate is pressurized in a mold or between pressing plates; an autoclave molding method to pressurize and heat any configuration of forming material laminate in an autoclave; a bagging molding method to pressurize and heat any configuration of forming material laminate wrapped with film and vacuumed inside at atmospheric pressure in an oven; a wrapping tape method to wind a tape around the continuous fiber-reinforced thermoplastic resin of any configuration with tension to be heated in an oven; an inner pressure molding method to inject gas or liquid into cores provided in a mold containing any configuration of continuous reinforcing-fiber thermoplastic resin; or a 3D printing method to form a three-dimensional shape of heated and pressurized forming material which is fused and laminated. It is preferable to employ a 3D printing method suitable for molding a complicated shape.

The fiber-reinforced thermoplastic resin filament and its shaped product excellent in characteristics can be applied to airplane parts, motor parts, electric/electronic parts, building materials, containers, daily necessities, daily articles and sanitary goods. It is preferable that the fiber-reinforced thermoplastic resin filament and its shaped product are applied to parts demanding stable mechanical properties such as airplane engine peripheral parts, airplane exterior parts, automobile body parts, vehicle frame, automobile engine peripheral parts, automobile underhood parts, automobile gear parts, automobile interior parts, automobile exterior parts, intake or exhaust parts and engine cooling water parts, automobile electric component parts, or electric/electronic parts. Specifically, the fiber-reinforced thermoplastic resin filament and its shaped product are applied to airplane engine peripheral parts such as fan blades, airplane parts such as landing gear pod, winglet, spoiler, edge, ladder, elevator, fairing and rib, automobile body parts such as sheets, front body, underbody, pillars, members, frames, beams, supports, rails and hinges, automobile engine peripheral parts such as engine cover, air intake pipe, timing belt cover, intake manifold, filler cap, throttle body and cooling fan, automobile underhood parts such as top and base of cooling fan or radiator tank, cylinder head cover, oil pan, brake piping, fuel tube and exhaust gas system parts, automobile gear parts such as gear, actuator, bearing retainer, bearing cage, chain guide and chain tensioner, automobile interior parts such as shift lever bracket, steering lock bracket, key cylinder, door inner handle, door handle cowl, indoor mirror bracket, air-conditioner switch, instrumental panel, console box, glove box, steering wheel and trim, automobile exterior parts such as front fender, rear fender, fuel lid, door panel, cylinder head cover, door mirror stay, tailgate panel, license garnish, roof rail, engine mount bracket, rear garnish, rear spoiler, trunk lid, rocker molding, molding, lamp housing, front grille, mudguard and side bumper, intake or exhaust parts such as air intake manifold, intercooler inlet, turbo charger, exhaust pipe cover, inner Bush, bearing retainer, engine mount, engine head cover, resonator and throttle body, engine cooling water system parts such as chain cover, thermostat housing, outlet pipe, radiator tank, alternator and delivery pipe, automobile electric component parts such as connector, wire harness connector, motor parts, lamp socket, sensor in-vehicle switch and combination switch, electric/electronic parts such as generator, motor, transformer, converter, voltage regulator, rectifier, resistor, inverter, relay, contact point for power, breaker, switch, knife switch, multipole rod, motor case, TV housing, note PC housing and internal parts, CRT display housing and internal parts, printer housing and internal parts, cell-phone housing and internal parts of cell-phone, and mobile PC or handheld mobile gear, electric parts such as IC, LED-adaptive housing, capacitor seat plate, fuseholder, gears, cases and cabinets, electronic parts such as connector, SMT-adaptive connector, card connector, jack, coil, coil bobbin, sensor, LED lamp, socket, resistor, relay, relay case, reflector, small switch, power supply parts, coil bobbin, capacitor, variable capacitor case, optical pick-up chassis, oscillator, terminal boards, transformers, plugs, printed circuit boards, tuners, speakers, microphones, headphones, small size motor, magnetic head base, power module, Si power module, SiC power module, semiconductor, liquid crystal, FDD carriage, FDD chassis, a motor brush holder, transformer material, parabolic antenna, computer parts or the like.

Examples

Hereinafter, our filaments and shaped products will be explained in more detail with reference to Examples although this disclosure is not limited thereto. Characteristics are evaluated by the following methods in Examples and Comparative examples.

Volume Content (Vf)

The volume content Vf of the fiber-reinforced thermoplastic resin filaments obtained in Examples and Comparative examples are calculated by Formula (3) from mass W0 of the fiber-reinforced thermoplastic resin filament and mass W1 of residual reinforcing fiber left after heating the continuous fiber-reinforced thermoplastic resin filament to burn out the thermoplastic resin component at 500° C. in the air for 30 min.

$$Vf[\text{vol \%}] = 100 \times (W1/\rho f)/\{W1/\rho f + (W0-W1)/\rho 1\} \qquad (3)$$

$\rho f$: reinforcing fiber density [g/cm$^3$]
$\rho r$: thermoplastic resin density [g/cm$^3$]

Impregnation Characteristics

Cross sections of the fiber-reinforced thermoplastic resin filaments obtained in Examples and Comparative examples are observed in the thickness direction as follows. Samples prepared by embedding fiber-reinforced thermoplastic resin filament with epoxy resin are polished to make a cross section in the thickness direction of the fiber-reinforced thermoplastic resin filament well observed. The polished samples are photographed at magnification of 400 times with an ultra deep color 3D shape measurement microscope VHX-950F (controller part)/VH-Z100R (measurer part) (made by Keyence Corporation). Images are taken within (500 μm width)×(thickness) of the fiber-reinforced thermoplastic resin filament. Areas and voids of the fiber-reinforced thermoplastic resin filaments are measured with the taken images to calculate an impregnation rate by Formula (4).

Void rate [%]=100×(Total area of voids)/(Total area of fiber-reinforced thermoplastic resin filament) (4)

Uniformity (i) A cross section image is taken in a direction approximately perpendicular to the orientation direction of the fiber-reinforced thermoplastic resin filament.

(ii) The cross section image is divided into square units each having a side length defined by Formula (1).

(iii) Dispersion parameter d is calculated by Formula (2) defining it.

(iv) Operations (i) to (iii) are repeated to calculate average D of dispersion parameter d.

$$1.5a \leq t \leq 2.5a \quad (1)$$

a: fiber diameter
t: side length of unit $$\text{Dispersion parameter } d = 100 \times \text{(the number of units including reinforcing fibers within range)/(the number of all units)} \quad (2)$$

Evaluation Method

A sample of fiber-reinforced thermoplastic resin filament embedded with epoxy resin is cured at room temperature for 24 hours and then the cross section approximately perpendicular to the orientation direction of reinforcing fibers of the fiber-reinforced thermoplastic resin filament is polished to take an image with an ultra deep color 3D shape measurement microscope VHX-950F (controller part)/VH-Z100R (measurer part) (made by Keyence Corporation).

The taken image of cross section of the fiber-reinforced thermoplastic resin filament is divided into approximately square units having a side length satisfying Formula (1) without overlapping mutually by using an image analysis software. The number of approximately square units including reinforcing fibers is counted by the image analysis to calculate dispersion parameter d by Formula (2).

Different fields of view of 20 or more are photographed to calculate average value D of thus obtained dispersion parameter d and coefficient of variance.

Flexural Rigidity

The flexural rigidities of the fiber-reinforced thermoplastic resin filaments obtained in Examples and Comparative examples are calculated by Formula (6).

$$\text{Flexural rigidity} = E \times I \quad (6)$$

E: bending elastic modulus of fiber-reinforced thermoplastic resin filament
I: second moment of area The bending elastic moduli of fiber-reinforced thermoplastic resin filaments are determined according to JIS K 7074(2012). The filaments are bent in the axial direction for the determination.

Handling Ability

The handling abilities of the fiber-reinforced thermoplastic resin filaments obtained in Examples and Comparative examples are evaluated into the two levels between "Good" and "NG" according to criteria of fracture/bend of the fiber-reinforced thermoplastic resin filaments wound around a roll having 150 mm of inner diameter.

Good: without fracture and bend
NG: with fracture or bend

Raw Materials

The following raw materials are used in Examples and Comparative examples.

Carbon Fiber Bundle

PAN-based Carbon fiber (CF) "TORAYCA (registered trademark)" made by Toray Industries, Inc.

Thermoplastic Resin

Polyphenylene sulfide resin (PPS) "TORELINA (registered trademark)" made by Toray Industries, Inc.

Polyetheretherketone resin (PEEK) "VICTREX (registered trademark)" made by Victrex Japan Inc.

Polyether ketone ketone (PEKK) "KEPSTAN (registered trademark)" made by Arkema K.K.

Polyetherimide (PEI) "ULTEM (registered trademark)" made by SABIC Company

A carbon fiber bundle wound around a bobbin is continuously unwound off the bobbin through a yarn guide. The continuously unwound carbon fiber bundle is impregnated with resin shown in Table 1 supplied constantly from a feeder into an impregnation die. The carbon fiber bundle impregnated in the impregnation die is continuously drawn out with a draw roller at 1 m/min of draw speed through a nozzle of the impregnation die. The drawn-out carbon fiber bundle is cooled down with a cooling roller to solidify the thermoplastic resin to make a continuous fiber-reinforced thermoplastic resin filament wound by a winder. Thus obtained fiber-reinforced thermoplastic resin filament has a circular cross section the reinforcing fibers are unidirectionally oriented. The above-described evaluation is performed with the obtained fiber-reinforced thermoplastic resin filament.

Table 1 shows the evaluation results.

TABLE 1

| | | | Example 1 | Example 2 | Example 3 | Example 4 | Example 5 | Example 6 | Example 7 | Comparative example 1 |
|---|---|---|---|---|---|---|---|---|---|---|
| Raw material | Reinforcing fiber | — | CF | CF | CF | CF | CF | CF | CF | CF |
| | Resin | — | PPS | PPS | PPS | PPS | PEEK | PEKK | PEI | PPS |
| Filament | Fiber volume content | % | 50 | 40 | 60 | 50 | 50 | 50 | 50 | 50 |
| | Length | m | >10 | >10 | >10 | >10 | >10 | >10 | >10 | >10 |
| | Thickness | mm | 0.6 | 0.7 | 0.5 | 0.3 | 0.6 | 0.6 | 0.6 | 4 |
| | Cross-section shape | — | Circle | Circle | Circle | Quadrangle | Circle | Circle | Circle | Circle |
| | Void rate | % | 0.5 | 0.3 | 0.6 | 0.5 | 0.6 | 0.6 | 0.6 | 0.9 |
| | Dispersion parameter D | % | 98 | 94 | 99 | 98 | 97 | 99 | 96 | 93 |
| | Coefficient of variance for dispersion parameter Variation index | % | 1.9 | 1.8 | 0.5 | 1.8 | 1.4 | 1.7 | 1.5 | 2.9 |
| Evaluation | Flexural rigidity | N·m² | 0.0009 | 0.001 | 0.0005 | 0.01 | 0.0005 | 0.0005 | 0.0005 | 2 |
| | Handling ability | — | ○ (Good) | ○ (Good) | ○ (Good) | ○ (Good) | ○ (Good) | ○ (Good) | ○ (Good) | X (NG) |

The fiber-reinforced thermoplastic resin filaments obtained in Examples 1 to 7 included uniformly-dispersed reinforcing fibers with less voids compared to Comparative example 1. We found that the fiber-reinforced thermoplastic resin filaments having a great fiber content and a small flexural rigidity were excellent in handling ability at the time of forming.

INDUSTRIAL APPLICATIONS

Our fiber-reinforced thermoplastic resin filament can be formed into a desirable shape by a method such as press forming method and 3D printing method. The 3D printing method needs to achieve both a good reinforcing effect and handling ability at the time of forming and is therefore suitable for a forming method of our fiber-reinforced thermoplastic resin filament. Our shaped products obtained by forming the fiber-reinforced thermoplastic resin filament are applicable to airplane parts such as airplane engine peripheral parts, airplane interior parts and airplane exterior parts, automobile parts such as vehicle frame, automobile engine peripheral parts, automobile underhood parts, automobile gear parts, automobile interior parts, automobile exterior parts, intake or exhaust parts, engine cooling water parts and automobile electric component parts, or electric/electronic parts such as LED reflector and SMT connector.

The invention claimed is:

1. A fiber-reinforced thermoplastic resin 3D printing filament of continuous reinforcing fiber impregnated with a thermoplastic resin, having
   (a) a volume content of the reinforcing fiber of 30 to 80 vol % and a volume content of the thermoplastic resin filament of 70 to 20 vol %,
   (b) a thickness of 0.01 to 3 mm,
   (c) a filament length of 1 m or more, and
   (d) a circular filament cross section.

2. The fiber-reinforced thermoplastic resin 3D printing filament according to claim 1, having a void rate of 5% or less.

3. The fiber-reinforced thermoplastic resin 3D printing filament according to claim 1, having a flexural rigidity of 1 N·m² or less.

4. The fiber-reinforced thermoplastic resin 3D printing filament according to claim 1, wherein the reinforcing fiber is made of at least one selected from a group consisting of a carbon fiber, a glass fiber and an aramid fiber.

5. The fiber-reinforced thermoplastic resin 3D printing filament according to claim 1, wherein the thermoplastic resin is made of at least one selected from a group consisting of polyphenylene sulfide resin (PPS), polyarylene ether ketone resin (PAEK), polyetherimide resin (PEI), polyether sulfone resin (PES) and a liquid crystalline polymer resin (LCP).

6. The fiber-reinforced thermoplastic resin 3D printing filament according to claim 1, wherein the reinforcing fiber has 90% or more of an average value D of a dispersion parameter d calculated by steps (i) to (iv):
   (i) taking an image of a cross section of the fiber-reinforced thermoplastic resin filament perpendicular to an orientation direction;
   (ii) dividing the image of the cross section into square units having a side length t within a range of Formula (1);
   (iii) calculating the dispersion parameter d by Formula (2);
   (iv) calculating the average value D of the dispersion parameter d by repeating a plurality of sets of steps (i) to (iii), $$1.5a \leq t \leq 2.5a \quad (1), \text{where:}$$

a: fiber diameter; and
t: side length of unit, $$\text{Dispersion parameter } d = 100 \times (\text{the number of units including reinforcing fibers within range})/(\text{the number of all units}) \quad (2).$$

7. The fiber-reinforced thermoplastic resin 3D printing filament according to claim 1, wherein the average value D of the dispersion parameter d has 4% or more of a coefficient of variance.

8. The fiber-reinforced thermoplastic resin 3D printing filament according to claim 1, further comprising an outermost layer coated with the thermoplastic resin.

9. A shaped product, comprising the fiber-reinforced thermoplastic resin 3D printing filament according to claim 1.

* * * * *